United States Patent
Mettry et al.

(10) Patent No.: US 12,023,858 B2
(45) Date of Patent: Jul. 2, 2024

(54) REFRACTIVE INDEX MATCHING BASE RESIN FOR EXTREMELY FINE THREE-DIMENSIONAL CERAMIC STRUCTURES

(71) Applicant: Lawrence Livermore National Security, LLC, Livermore, CA (US)

(72) Inventors: Magi Mettry, Livermore, CA (US); Juergen Biener, San Leandro, CA (US); James S. Oakdale, Castro Valley, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 135 days.

(21) Appl. No.: 17/131,353

(22) Filed: Dec. 22, 2020

(65) Prior Publication Data

US 2022/0193992 A1     Jun. 23, 2022

(51) Int. Cl.
| | |
|---|---|
| C09D 4/00 | (2006.01) |
| B29C 64/153 | (2017.01) |
| G02B 1/00 | (2006.01) |
| B33Y 70/00 | (2020.01) |
| B33Y 80/00 | (2015.01) |

(52) U.S. Cl.
CPC .............. B29C 64/153 (2017.08); *C09D 4/00* (2013.01); *G02B 1/007* (2013.01); *B33Y 70/00* (2014.12); *B33Y 80/00* (2014.12); *C04B 2235/36* (2013.01)

(58) Field of Classification Search
CPC ...................................................... C09D 4/00
See application file for complete search history.

(56) References Cited

U.S. PATENT DOCUMENTS

| | | | | |
|---|---|---|---|---|
| 5,532,398 A | * | 7/1996 | Wolter | C07F 7/1804 |
| | | | | 528/33 |
| 2016/0185804 A1 | * | 6/2016 | Wolter | C07F 7/081 |
| | | | | 556/427 |

FOREIGN PATENT DOCUMENTS

| | | | | |
|---|---|---|---|---|
| CN | 108250716 A | * | 7/2018 | ........... B32B 17/061 |
| WO | WO-2019006184 A1 | * | 1/2019 | |

OTHER PUBLICATIONS

Chen et al (UV-Cured Fluoride-Free Polyurethane Functionalized Textile with pH-Induced Switchable Superhydrophobicity and Underwater Superoleophobicity for Controllable Oil/Water Separation, ACS Sustainable Chemistry & Engineering (2018), 6(12), 16616-16628) (Year: 2018).*

Machine translation of CN-108250716-A. (Year: 2018).*

* cited by examiner

*Primary Examiner* — Wenwen Cai
(74) *Attorney, Agent, or Firm* — Zilka-Kotab, P.C.

(57) ABSTRACT

An optically clear resin for additive manufacturing includes an optically clear ceramic precursor having a pre-defined refractive index. Each molecule of the ceramic precursor has at least two photopolymerizable functional groups, at least one of the photopolymerizable functional groups being functionalized with a refractive index-tuning group thereby causing the ceramic precursor to have the pre-defined refractive index.

16 Claims, 9 Drawing Sheets

REFRACTIVE INDEX MATCHING BASE RESIN FOR EXTREMELY FINE THREE-DIMENSIONAL CERAMIC STRUCTURES

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to photo-polymerization based additive manufacturing techniques, and more particularly, this invention relates to refractive index-matched ceramic precursor resins for forming ceramic structures having extremely fine features.

BACKGROUND

Over the past decade, advances in additive manufacturing (AM) have enabled the fabrication of low-density, high-strength materials with engineered architectures. AM technologies such as stereolithography (SLA), fused deposition modeling (FDM), selective laser sintering (SLS), and direct ink writing (DIW) have demonstrated the ability to pattern to varying degrees, a wide variety of materials, including metals, ceramics, plastics, rubbers, etc. Different AM techniques are distinguished from one another based on material processability, resolution capability and throughput. In other words, not all materials are directly amenable to AM, and moreover, factors such as cure-rate, rheological properties, stability, compatibility, etc. need to be considered and adjusted accordingly. FDM and SLA, for instance, are largely restricted to polymer or polymeric-based composites, whereas SLS (used interchangeably here with select laser melting) can process a different subset of polymers in addition to select glasses, ceramics, metals, etc.

Ceramic structures are known to be favorable materials in a wide range of applications because of their great strength, durability, high levels of insulation, thermal stability, low thermal expansion coefficient, stiffness and overall chemical inertness. Their chemical and physical stability in high temperature ranges make them excellent materials for the turbine blades of aircrafts and heat shields in vehicles for space exploration. In addition, ceramics exhibit low toxicity and high durability making these materials excellent candidates for biomedical implants/devices and consumer grade kitchenware. However, in the nano-microscale domain of the additive manufacturing (3D printing) the smallest possible detail, feature, etc. is 350 microns ($\mu m$) on industrial SLS printers, and 250-800 $\mu m$ nozzles on FDM machines.

Ceramic material seem to have less presence beyond those dimensions which stems from two main obstacles. First, ceramic materials are formed from ceramic powders comprised of ceramic particles, and thus the large variations in ceramic particle size limit printability. Second, effective printing and post-processing limit the ability to fabricate ceramic objects with complex features.

It would be desirable to be able to fabricate self-supporting ceramic structures having nanoscale features.

SUMMARY

In one embodiment, an optically clear resin for additive manufacturing includes an optically clear ceramic precursor having a pre-defined refractive index. Each molecule of the ceramic precursor has at least two photopolymerizable functional groups, at least one of the photopolymerizable functional groups being functionalized with a refractive index-tuning group thereby causing the ceramic precursor to have the pre-defined refractive index.

In another embodiment, a ceramic product includes a printed self-supporting three-dimensional ceramic structure formed by additive manufacturing. The printed self-supporting three-dimensional ceramic structure includes a pre-defined geometric arrangement of features having an average diameter in a range of greater than 50 nanometers to less than 300 nanometers.

In yet another embodiment, a method of forming a self-supporting ceramic structure having a pre-defined geometric arrangement of features, where the features have an average diameter in a range of greater than about 50 nanometers to less than 300 nanometers, includes forming a three-dimensional structure by additive manufacturing using a resin comprising an optically clear ceramic precursor having a pre-defined refractive index and a photoinitiator, and heating the formed three-dimensional structure for transformation to the self-supporting ceramic structure.

Other aspects and advantages of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As also used herein, the term "about" denotes an interval of accuracy that ensures the technical effect of the feature in question. In various approaches, the term "about" when combined with a value, refers to plus and minus 10% of the reference value. For example, a thickness of about 10 nm refers to a thickness of 10 nm±1 nm, a temperature of about 50° C. refers to a temperature of 50° C.±5° C., etc.

A nanoscale is defined as between 1 nanometer and about 500 nanometers.

The following description defines a material being optically clear as allowing light to pass through at a wavelength of interest for printing. A transparent (or optically clear) material, e.g., resin, is generally defined as having a transmittance value of at least 95% of light passing through the material, preferably, at least 98% of light passing through the material at the wavelength of printing, e.g., infrared for two photon polymer-direct laser writing. An optically clear material is defined as a material with essentially no light absorbance properties. In some cases, a degree of transparency may also be defined as not opaque, optically clear, optically transparent, etc. These are by way of example only and are not meant to be limiting in any way.

The following description discloses several preferred embodiments of an forming a self-supporting ceramic structure having ultrafine features and/or related systems, methods and formulations.

In one general embodiment, an optically clear resin for additive manufacturing includes an optically clear ceramic precursor having a pre-defined refractive index. Each molecule of the ceramic precursor has at least two photopolymerizable functional groups, at least one of the photopolymerizable functional groups being functionalized with a refractive index-tuning group thereby causing the ceramic precursor to have the pre-defined refractive index.

In another general embodiment, a ceramic product includes a printed self-supporting three-dimensional ceramic structure formed by additive manufacturing. The printed self-supporting three-dimensional ceramic structure includes a pre-defined geometric arrangement of features having an average diameter in a range of greater than 50 nanometers to less than 300 nanometers.

In yet another general embodiment, a method of forming a self-supporting ceramic structure having a pre-defined geometric arrangement of features, where the features have an average diameter in a range of greater than about 50 nanometers to less than 300 nanometers, includes forming a three-dimensional structure by additive manufacturing using a resin comprising an optically clear ceramic precursor having a pre-defined refractive index and a photoinitiator, and heating the formed three-dimensional structure for transformation to the self-supporting ceramic structure.

A list of acronyms used in the description is provided below.

| | |
|---|---|
| 3D | Three-dimensional |
| AM | Additive Manufacturing |
| DLW | Direct laser writing |
| SiOC | silicon oxycarbide |
| μm | micron |
| nm | nanometer |
| POSS | polyhedral oligomeric silsesquioxane |
| RI | refractive index |
| SEM | Scanning Electron Micrograph |
| TPP | Two photon polymerization |
| TW | terawatt |

According to one embodiment, a printable resin for forming a self-supporting three-dimensional (3D) structure may be processed from a polymer into a high temperature silicon oxycarbide ceramic. As described herein, the resin may be printed via direct laser writing two photon lithography. A self-supporting structure is a structure that stands up, upright, vertical, etc. without being supported by a support system, second material, etc. The printed self-supporting structure includes components having ultra-fine sub-micron features. In some approaches, the fine features have an average diameter in a range of greater than 50 nanometers (nm) to less than 300 nm.

In various approaches, AM techniques provide control of printing features, ligaments, etc. of self-supporting 3D structures having length scales in a range between 100 nanometers to greater than 100 μm. Stereolithography-based AM techniques are notable for high throughput, fine features and detailed prototyping. Even higher resolution may be achieved with TPP-DLW, which can produce ligaments on the order of 100 nm.

In one approach, conventional two photon polymerization-direct laser writing (TPP-DLW) allows formation of ceramic structures having nanoscale features. Two photon polymerization (TPP) lithography is a direct laser write (DLW) process that enables fabrication of millimeter scale 3D structures with submicron building blocks. During direct laser writing, as illustrated in part (a) of FIG. 1, a conventional TPP mode 100 uses an infrared femtosecond laser beam 110 that has been focused through a microscope objective lens 108. In the conventional mode TPP mode 100, the laser beam 110 travels through immersion oil 106 and an optically clear substrate 104 layer, for example, a glass slide, before initiating local polymerization in the photoresist on the backside of the optically clear substrate. Submicron volume pixel ("voxel") features 101 are printed in the interior of the photopolymer resin 102 via localized polymerization reactions that are initiated by a nonlinear two photon absorption process in which two photons are near-simultaneously absorbed at high laser intensities. A part may be built in a layer-by-layer fashion within the resin 102 by progressively moving the objective lens 108 closer to the substrate 104 layer through the immersion oil 106. For each mode of the TPP-DLW system, the building direction is in the direction of the moving objective lens 108. However, for the conventional mode, the height of the printed part is limited by the movement of the objective lens 108 toward the substrate 104. Thus, the maximum height of the part is the working distance de of the objective lens 108 minus the thickness of the substrate thickness 104. Using a low NA objective lens, e.g., 25×, results in a larger working distance of the objective lens, but also a lower resolution of the voxel. Thus, an increased working distance de results in an increased voxel size thereby generating larger feature sizes during printing. Eventually during printing, the objective lens 108 may physically stop at the substrate 104 layer thereby preventing any further printing.

Figure 1:
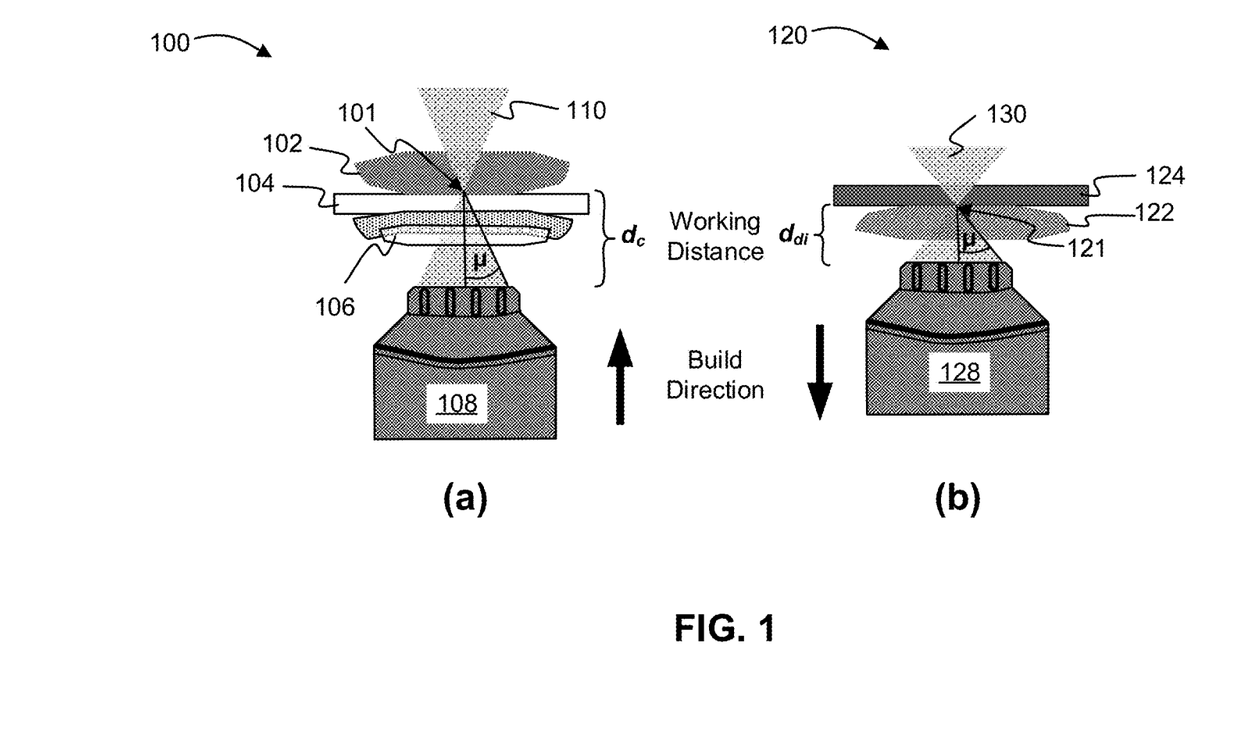
FIG. 1 depicts schematic diagrams of two photon polymerization (TPP) lithography. Part (a) is a schematic drawing of a conventional mode of TPP lithography, and part (b) is a schematic drawing of dip-in mode of TPP lithography.

In addition, during printing using the conventional TPP mode, a height of a part may likely be further limited by the system The RI of a polymerized photoresist is different from the RI of the original resin (because of densification), thus light traveling through the already polymerized photoresist is refracted which decreases the photon density in the focal spot. Thus, the extent of build height tends to be substantially lower than the limit determined by the physical stop of the objective lens 108 at the substrate 104 layer. Moreover, the light intensity from the laser beam 110 shining up through the building part will be increasingly diminished by the increasing height of the building part during printing thereby causing the subsequent printing to become non-uniform. The conventional mode of TPP is limited to generating parts with a height of about tens of microns.

Moreover, the conventional mode of TPP 100 depends on a clear substrate 104, for example glass, so the laser beam may pass through. Thus, writing on opaque substrates such as opaque silicon or metal is not possible.

The conventional mode of TPP is useful for testing the feasibility of printing with a new resin that does not have the same refractive index as the objective lens. Printing in the conventional mode which produces parts with a limited height may not be adversely affected by mismatch between the refractive index of the resin and the objective lens. In addition, the conventional mode may also be a safe mode to test a new resin as the photoresist is physically separated from the objective by the substrate, thereby preventing possible irreversible damage to an objective by uncontrolled photoresist deposition on the lens itself. For printing taller parts in the dip-in mode, however, a mismatch in the refractive index may lead to spherical aberrations that degrade the printing performance of the taller printed parts.

A schematic representation of the dip-in mode 120 (for example, DiLL, Dip-in Laser Lithography) of TPP lithography is shown in part (b) of FIG. 1. The resin 122 may sit directly on the objective lens 128 and the focal spot 121 of the beam 130 is located at a working distance da away from the objective 128 exterior surface. A part may be built in a layer-by-layer fashion by progressively driving the objective lens 128 away from the substrate 124 layer. The build direction in the dip-in mode 120 is in the opposite direction as the conventional mode 100 since the objective lens 128 moves away from the substrate 124. The height of a printed part is not limited by the working distance da of the objective lens 128 since the objective lens 128 moves away from the substrate 124 with increasing height of the printed part. Moreover, the working distance da between the lens and the voxel (e.g., focal spot of printing) remains constant thereby maintaining a constant size of the printed feature on the nanometer scale. Thus, millimeter tall structures having nanoscale features may be printed in the dip-in mode. Moreover, parts may be printed on top of a substrate 124 composed of opaque materials such as silicon, metals, etc.

Since the objective lens contacts the resin during printing in the dip in mode, optimal printing may occur when the refractive indices of the resin and the objective lens are the same, and ideally, the resin is optically clear. If the refractive index of the resin 122 and objective lens 128 do not match, spherical aberrations may occur and may cause large distortions in the printed part.

As illustrated in part (b), the laser beam 130 is transmitted into an optically clear photoresist resin 122 to polymerize monomers of the photoresist resin 122. The high intensity focal spot 121 is referred to as a voxel, a 3D pixel (x,y,z), etc. which represents the smallest feature that can be printed within the photoresist resin 122. In preferred approaches, a smaller size of the focal spot 121 within the photoresist resin 122 generates a finer feature size and higher resolution of the structure comprised of outputted polymerized material.

In one approach, a direct laser writing machine, e.g., Nanoscribe, forms a focal spot (voxel size) predominantly controlled by two main factors: focusing optics and the refractive index (RI) of the optically clear resin. The numerical aperture (NA) of the system is defined by Equation 1 as follows:

$$\text{Numerical Aperture(NA)} = n \times \sin \mu \quad \text{Equation 1}$$

where n is refractive index of the medium in which the lens is working and μ is half angular aperture, as illustrated in the schematic drawings of the TPP modes of FIG. 1. A conventional TPP mode 100 typically includes a low NA objective lens 108, as shown in part (a). A dip-in TPP mode 120 may utilize a high NA objective lens 128, as shown in part (b), that allows fabrication of high-resolution fine features with a photoresist resin having a refractive index (RI) of 1.52±0.005. The high NA objective lens 128 allows fabrication of finer features having an average diameter of greater than 100 nm. In some approaches, a size of the printed features may be in a range of about 100 nm to 300 nm. In exemplary approaches, a resin that supports TPP microfabrication is optically clear and has an appropriate RI that matches the focusing unit of the TPP micro-fabrication machine.

In addition to optical transparency, the refractive index (RI) of the photoresist resin needs to be matched to the focusing optics used to enable the dip-in direct laser writing-TPP processing. Preferable resins used in dip-in TPP processing include generally a mixture of carbon-based photopolymerizable functionalized monomers there the RI may be easily tuned by adjusting the fraction of the individual monomer components. For dip-in mode of TPP printing, employing a high NA objective lens allows fabrication of a finer voxel size, e.g., about 100 nm. In exemplary approaches, as demonstrated in FIG. 2, matching the refractive index (RI) of the photoresist resin to the high NA objective lens is critical for forming high resolution features. Photoresists having different RI values were created with the monomer components BPA and PETA using different mixing ratios, illustrated in part (a). Part (b) is a plot of the RI versus threshold for each photoresist resin. The images depict the resolution of features formed with photoresist resins having different RI. The image of part (c) shows less defined features (poor resolution) were generated with a polymer photoresist resin having a mis-matched RI of about 1.492. In sharp contrast, the image of part (d) shows defined features having high resolution with a polymer photoresist resin having a matched RI of about 1.522. These images are by way of example only and are not meant to be limiting in any way.

Figure 2:
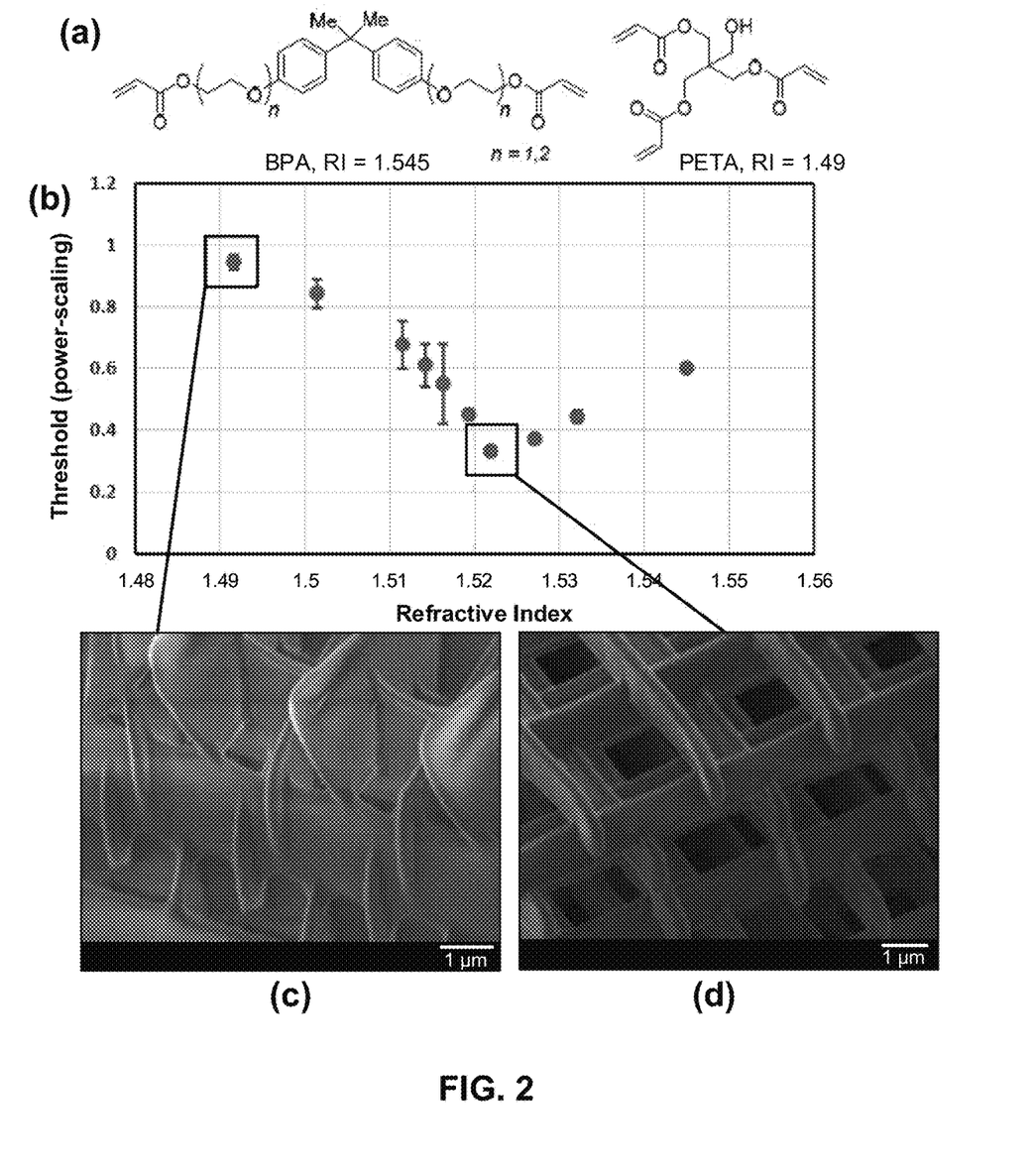
FIG. 2 depicts a series of the effect of refractive index matching of the resin for forming a high resolution structure, according to one embodiment. Part (a) depicts the structures of BPA and PETA, each having a specific refractive index, part (b) is a plot of resins having different refractive indices versus threshold power scaling, according to one embodiment. Part (c) is an image of structure formed by dip-in TPP lithography using a resin having a refractive index of about 1.492 and part (d) is an image of a structure formed by dip-in TPP lithography using a resin having a refractive index of about 1.522.

Moreover, as shown in the plot in part (b) of FIG. 2, the threshold of laser intensity may be measured in terms of power-scaling (y-axis). The threshold value indicates the minimum laser intensity that generates a free-standing (e.g., self-supporting) log-pile structure. A mis-matched RI, as demonstrated with resins having RI lower than 1.52 or higher than 1.52 have a higher threshold such that a higher laser intensity needs to be employed to yield a printable part. In addition, a higher laser intensity provides a higher aspect ratio of the voxel dimensions. Thus, a voxel size may depend on the laser power of the printing system as the voxel size is determined by a critical photon density resulting in the two photon polymerization effect. For example, with increasing laser power, the volume where the critical photon density is reached increases. Typically, laser power may be in a range of 1.03 to 3.35 TW/cm$^2$.

In one embodiment, an optically clear resin for additive manufacturing includes an optically clear ceramic precursor having a pre-defined refractive index. An optically clear resin is defined as a resin being able to transmit light without significantly absorbing light, scattering light, etc. The resin may have a physical property of allowing light to pass through without being adsorbed at the wavelength used by the laser in the printing system. Preferably, in the TPP-DLW printing system, the resin is optically clear to the infrared spectrum in a range from about 700 nanometers (nm) to 1000 nm.

In conventional processes to form ceramic parts, ceramic components are traditionally prepared from ceramic powders by first incorporating the ceramic powder precursors into a paste extruding the paste into a green body having a desired shape, the resulting green body is slowly dried and sintered at high temperatures to form the ceramic material. However, a conventional formulation including ceramic powders cannot meet the optical requirements of a resin used in laser-directed writing (e.g., TPP-DLW) and thus traditional ceramic resins tend not to be applicable to the dip-in mode of TPP fabrication. In particular a conventional formulation of ceramic powders is typically an opaque paste, not optically clear, not optically transparent, etc.

According to various embodiments described herein, the optically clear ceramic precursor resin is essentially free of particles. The components of the ceramic precursor resin are included in one molecule such that each of the components, e.g., photopolymerizable functional groups, refractive index-tuning groups, ceramic building blocks, etc. are covalently bound to a single molecule. The optically clear ceramic precursor resin is a homogenous material in preferred embodiments. Moreover, the optically clear ceramic precursor resin is a single phase system in preferred embodiments.

Each molecule of the ceramic precursor preferably has at least two photopolymerizable functional groups, at least one of the photopolymerizable functional groups is functionalized with a refractive index-tuning group thereby causing the ceramic precursor to have the pre-defined refractive index. A refractive index-tuning group is a functional group having a refractive index such that covalent bonding of the refractive index-tuning group to the molecule causes a change in the refractive index of the molecule. A refractive index-tuning group may be any group that has a different refractive index than the photoresist molecule. A refractive index-tuning group may be any group known to one skilled in the art for lowering or increasing the refractive index. Examples of refractive index-tuning groups include a thiol group, a thiophenol group, bromine, chlorine, allyl groups, etc.

In some approaches, a photoresist monomer (e.g., ceramic precursor) may include non-photopolymerizable functional groups in addition to photopolymerizable functional groups that can be used for functionalization of the photoresist monomer. For example, in addition to photopolymerizable acrylate groups, a photoresist monomer may have non-photopolymerizable hydroxy (—OH) groups, amino (—NH$_2$) groups, etc. that may be used for RI tuning. Thus, a photoresist monomer having other functional groups available for covalent bonding to RI tuning moieties may have only two photopolymerizable functional groups.

The relation between the RI of a substance and the polarizability of its molecular components is mathematically described by the Lorentz-Lorenz equation. In general, lower indices (RI<1.4) can be achieved by adding electronegative groups, such as fluorinated moieties, whereas higher indices (RI>1.7) are obtained by doping polarizable groups, such as a sulfur, halogens (except fluorine), or extended conjugation. Thus, a ceramic precursor may be tuned to have a lower or higher RI by functionalizing the ceramic precursor molecules with specific refractive index-tuning groups.

In various approaches, the ceramic precursor may be a silane precursor. In one exemplary approach, the ceramic precursor is a polyhedral oligomeric silsesquioxane (POSS). In some approaches, the ceramic precursor POSS may be obtained commercially.

In various approaches, the photopolymerizable functional groups of the ceramic precursor molecule may include at least one of the following: acrylate, methyl acrylate, allyl, thiol, epoxy etc. In some approaches, the ceramic precursor molecule may include a combination of photopolymerizable functional groups.

Figure 3:
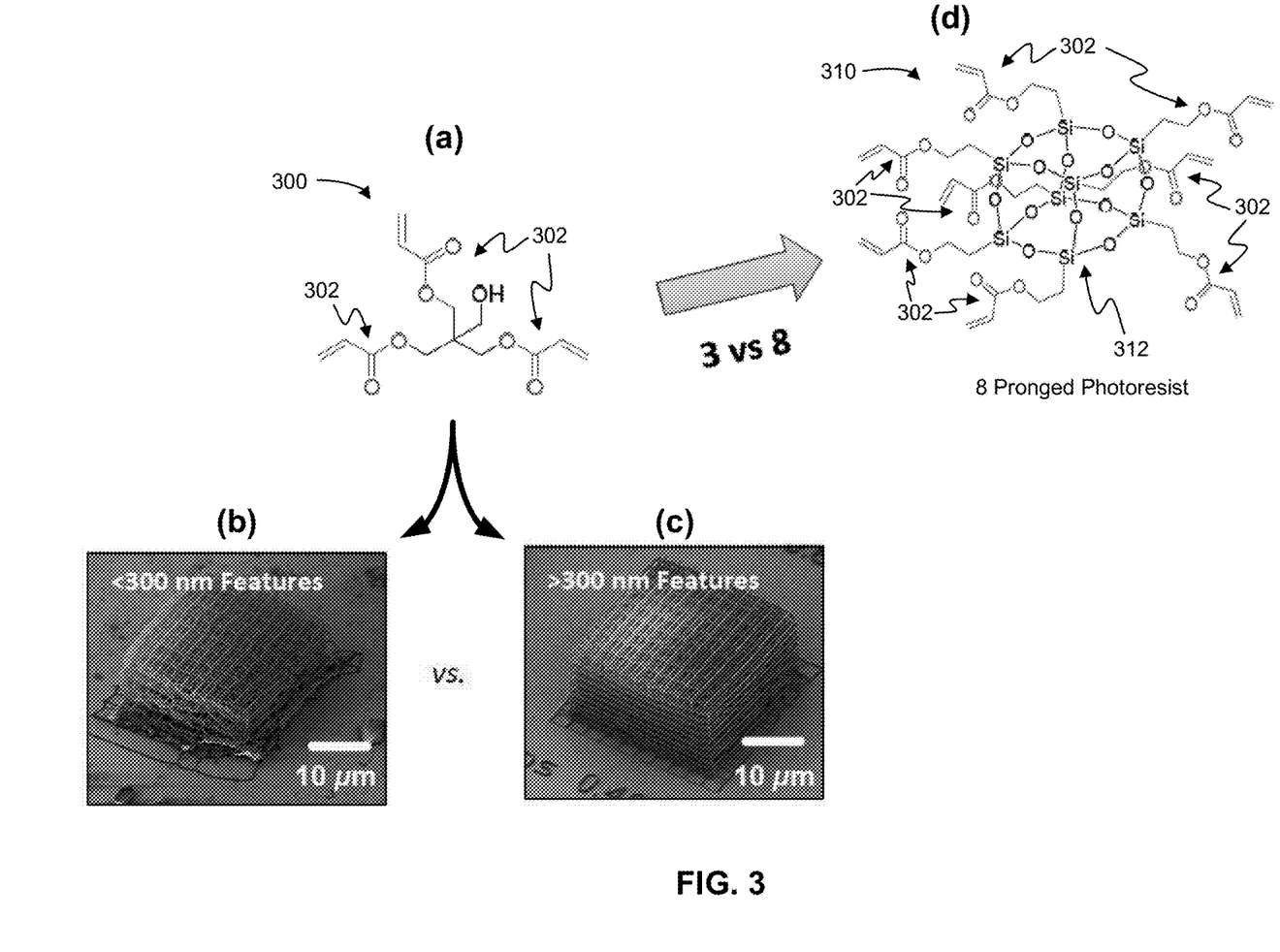
FIG. 3 depicts a comparison structures formed with different voxel size using a resin having a polymer resin molecule with three acrylate groups. Part (a) depicts a structure of a polymer resin molecule having three acrylate groups, part (b) is an image of a structure formed with the resin of part (a), the laser writing configured for a voxel size less than 300 nanometers and part (c) is an image of a structure formed with the resin of part (a), the laser writing configured for a voxel size greater than 300 nanometers. Part (d) depicts a structure of a molecule of a resin having 8 acrylate groups, according to one embodiment.

Using the conventional mode of TPP printing, a resin including greater than 3 photopolymerizable functional groups (e.g., acrylate) allows printing of a self-supporting structure with features of about 300 nm. As illustrated in FIG. 3, part (a) a polymer resin 300 includes 3 acrylate groups 302. Printing of a structure using a TPP system with a polymer resin 300 having 3 acrylate groups 302 allows fabrication of a structure with a focal spot (e.g., voxel) less than 300 nanometers and thus features having an average diameter less than 300 nm. However, the fabricated structure may not be self-supporting, as indicated by the collapsed structure depicted in the image of part (b).

Alternatively, printing a structure using a conventional TPP system with the polymer resin 300 having 3 acrylate groups 302 to fabricate a structure with a voxel greater than 300 nm, and thus features having an average diameter greater than 300 nm, may preferably result in a self-supporting structure, as depicted in the image of part (c). Current conventional photoresist resin systems are limited by the size of voxel during TPP printing such that a voxel generating features less than 300 nm fabricates a structure that is not self-supporting.

In preferred approaches, increasing the number of photopolymerizable functional groups per molecule of photoresist polymer resin may likely allow increased stability to the photoresist polymer molecules. In some approaches, each molecule of a ceramic precursor has at least two photopolymerizable functional groups per molecule. In one exemplary approach, each molecule of the ceramic precursor has at least eight photopolymerizable functional groups. As shown in part (d), a photoresist molecule 310 may preferably include up to eight acrylate groups 302. In an exemplary approach, a photoresist polymer 310 in which each molecule 312 has greater than three up to eight acrylate groups 302 may allow printing self-supporting structure with voxel less than 300 nm.

According to one embodiment as described herein, a resin for forming ceramic material includes preceramic resins, e.g., polysiloxane, that when heated to temperatures above 500° C. in inert atmosphere will transform from a polymer to a silicon oxycarbide (SiOC) ceramic. As described herein, according to one embodiment, a resin includes a pre-ceramic, optically clear polymer composed of a silica precursor. The pre-ceramic polymer resin may be printed into complex shapes using a direct laser writing-TPP technique and that may be subsequently converted from a polymeric structures into a ceramic structure.

Preceramic polymer materials, however, pose additional challenges and are much harder to formulate or/and synthesize. Simply physically mixing preceramic polymer material with a higher RI component to adjust the RI of the resin may not result in a homogenous resin. For example, preceramic polymer material may undergo micro separation which leads to inhomogeneities and optical aberrations. Moreover, if one component of the mixture has a higher vapor pressure, one of the components may evaporate over time leading to instability of the mixture and inhomogeneity and reduced shelf life.

In one embodiment, a system includes a resin having a tunable RI and a high optical transparency using an organic/inorganic hybrid material, e.g., polyhedral oligomeric silsesquioxane (POSS) functionalized with thiophenol groups. Commercially available POSS precursors may be functionalized with covalent-bonded higher refractive index-tuning group, e.g., such as thiophenol groups.

Figure 4A:
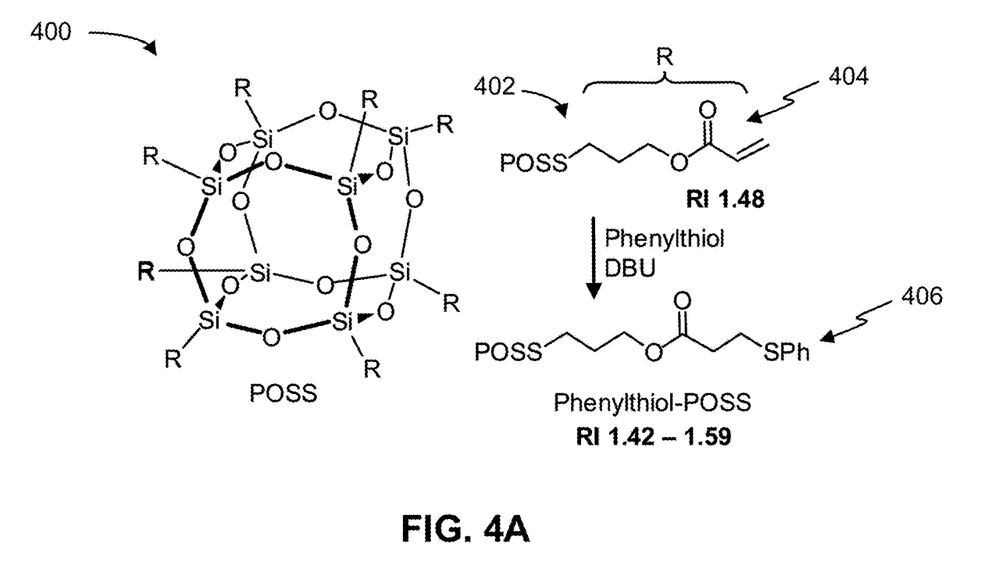
FIG. 4A depicts the structure of a polyhedral oligomeric silsesquioxane (POSS) molecule and a modification to form a functionalized POSS, according to one embodiment.

FIG. 4A illustrates a schematic drawing of an illustrative component of an optically clear ceramic precursor resin. As shown, a molecule of a ceramic precursor may be a molecule of POSS 400. POSS is a hybrid, intermediate molecule ($RSiO_{1.5}$) between silica ($SiO_2$) and silicone ($R_2SiO$), where R is a functional group. Each POSS 400 includes nonreactive organic functionalities for solubility. Each POSS molecule has covalently bonded reactive functionalities (R) that may be modified for various applications, e.g., polymerization, grafting monomers, etc.

Tuning the refractive index of a photoresist polymer by covalently bonding a refractive index-tuning group provides a more stable photoresist resin. The photoresist resin is a homogenous mixture that does not undergo micro-separation since the tuning components are covalently bonded to the photoresist molecule. The photoresist resin is stable and has a long shelf-life since evaporation does not affect the composition of the molecule.

In one embodiment, as described herein, the POSS molecule 400 may be modified to have covalently-bonded reactive functionality (R) that may be optimized for enabling smaller voxel sizes for dip-in mode of TPP fabrication by tuning the refractive index of the POSS molecule. As shown, the POSS molecule may be modified by covalently bonding a refractive index-tuning group to the POSS molecule to tune the refractive index of the POSS molecule. For example, in preferred approaches R is an acrylate group 404. In exemplary approaches, each of the eight R functionalities of a POSS molecule 402 includes acrylate groups 404. In one approach, the RI of the POSS molecule 402 having acrylate groups 404 is 1.48.

In preferred approaches, the photopolymerizable functional groups (e.g., acrylate) of the POSS molecule may be modified with refractive index-tuning group to tune the RI of the POSS molecule. For example, as shown in FIG. 4A, up to six acrylate groups 404 of a POSS molecule 402 may be modified to include a refractive index-tuning group, such as a thiophenol group 406 to adjust the RI of the functionalized POSS molecule.

In an exemplary approach, up to six photopolymerizable functional groups of a POSS molecule may be modified with a refractive index-tuning group (RI-tuning group) to tune the RI of the POSS molecule. Functionalization of an acrylate group with an RI-tuning group may remove the polymerization functionality of the modified acrylate group. In one approach, up to six of the eight acrylate groups of POSS may be used for RI tuning to allow the remaining two unfunctionalized acrylate groups to be available for polymerization of the photoresist. In another approach, eight acrylate groups of POSS may be functionalized for RI tuning in a resin comprising a mixture of unfunctionalized POSS and functionalized POSS.

Addition of a thiophenol group 406 to at least one acrylate group 404 of the POSS molecule 402 shifts the RI of the POSS molecule 402, and in doing so the POSS molecule may be tuned to a preferred RI matching that of the focusing optic of the laser writing system. In preferred approaches, an effective number of thiophenol groups may be added to acrylate groups of the POSS molecule to tune the refractive index (RI) of the POSS molecule in a range of 1.42 to 1.57.

Figure 4B:
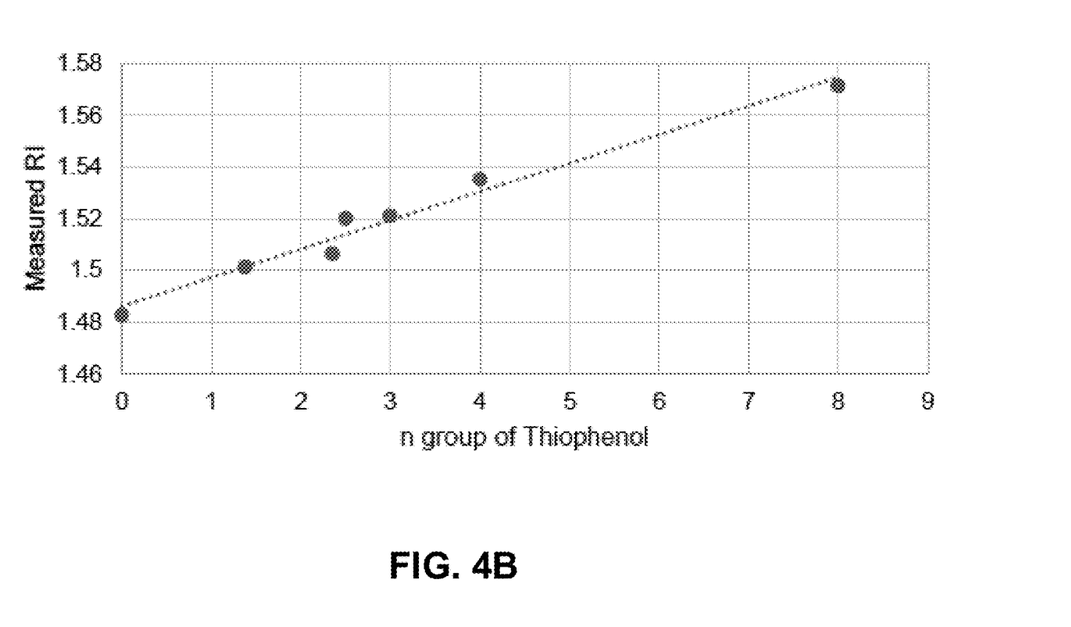
FIG. 4B is a plot of the number of thiophenol groups added to a POSS molecule versus the refractive index, according to one embodiment.

For example, FIG. 4B depicts a plot of measured RI (y-axis) of a POSS molecule having n groups of thiophenol (x-axis). As shown, as the number of thiophenol groups attached to a POSS molecule increases, the measured RI of the POSS molecule increases. Thus, in exemplary approaches, a POSS molecule may be modified with a refractive index-tuning group, e.g., thiol, thiophenol, monophenol thiol, diphenol thiol, triphenol thiol, halogen-containing aromatics, etc. to tune the RI of the POSS-based resin to match the focusing optic of the TPP system.

In various approaches, an optically clear ceramic precursor may be functionalized with an effective amount of refractive index-tuning group to adjust the RI of the ceramic precursor molecule. In preferred approaches, a molar ratio of refractive index-tuning group to ceramic precursor may be in a range of 1:1 to 8:1. For example, a molar ratio of thiophenol:POSS may be preferably 2:1.

Figure 8:
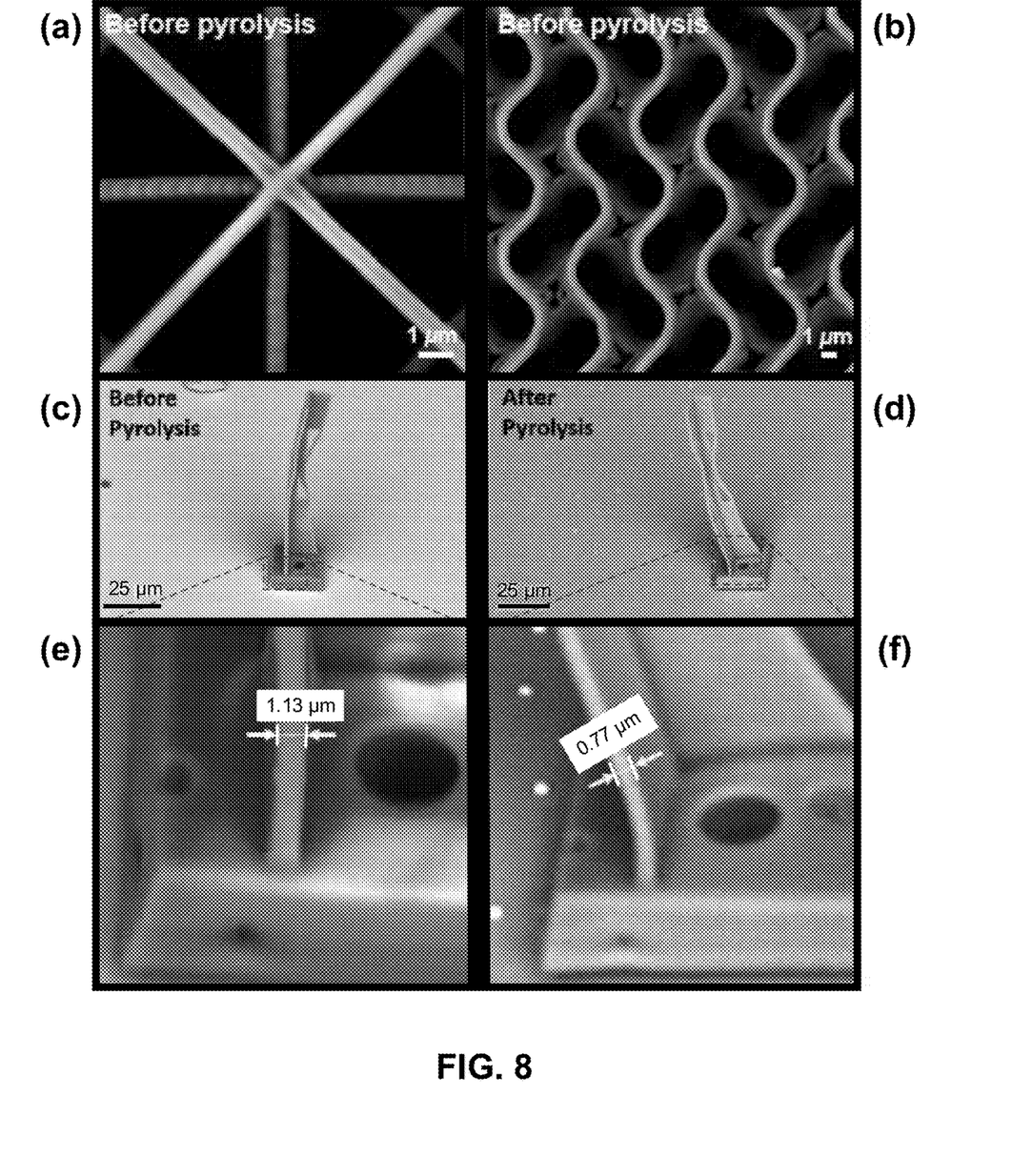
FIG. 8 is a series of images of complex geometric structures formed by TPP lithography using refractive index-matched resins, according to one embodiment. Parts (a) and (b) are images depicting different features of a geometric structure before pyrolysis. Part (c) is an image of a self-supporting structure before pyrolysis, and part (d) is an image of the structure of part (c) after pyrolysis. Part (e) is an image of a magnified view of a portion of the structure before pyrolysis, and part (f) is an image of a magnified view of a portion of the structure after pyrolysis.

In some approaches, an RI matched preceramic resin may be a homogenous mixture of the ceramic precursor molecules having different refraction indices. In one approach, a homogenous mixture may include high RI-functionalized POSS molecules, e.g., having three or more thiophenol groups per POSS molecule, and lower RI unfunctionalized POSS molecules. In one example, a resin may be a homogenous mixture including a fully functionalized (e.g., having 8 thiophenol groups) and a partially functionalized (e.g., between 0 to 6 thiophenol groups). A mixture having a combination of similar ceramic precursor molecules, e.g., a POSS molecule, is chemically and physically homogenous and, thus, has essentially no micro-separation of the mixture components. The variability of the refractive index-tuning group on the POSS molecules essentially does not change the polarity, solubility, etc. of the resin (as shown in FIG. 8).

In preferred approaches where the additive manufacturing system is a direct laser writing technique, the pre-defined refractive index of the ceramic precursor is configured to match the focusing optic of the machine performing the direct laser writing technique. In one approach, tuning the refractive index (RI) of the printable resin enables the use of a two-photon polymer system using a high NA lens such as a 63× lens to produce a structure (e.g., green body) having features with an average diameter less than 300 nm after sintering. In a preferred approach, the refractive index (RI) of the printable resin is 1.52±0.005. In exemplary approaches of using a dip-in mode TPP technique, a critical matching RI for the high NA objective lens is 1.52.

Moreover, in various embodiment, sintering the printed self-supporting structure from the optically clear ceramic precursor resin results in a complex silicon oxycarbide (SiOC) ceramic geometry with finer features than their printed counterparts.

According to one embodiment, the optically clear resin includes a photoinitiator. In one approach, the photoinitiator is appropriate for the direct laser writing system, as would be generally understood by one skilled in the art. In various approaches, the concentration of the photoinitiator in the resin may be in a range of about 0.05 wt. % to less than 1.0 wt. % of weight of total resin.

One or more additives may be added to the mixture for optimal printing of a 3D structure, depending on the AM technique to be used. In various approaches, an additive to the mixture may include a photoabsorber, a polymerization inhibitor, etc. In some approaches, a photoabsorber may further improve (e.g., decrease) the feature size by helping to get a stepper profile of the photon density in the voxel which defines the volume where the critical photon density condition for two photon polymerization is met. In one approach, the mixture includes a photoabsorber of any known type. Illustrative examples of photoabsorbers include benzopheone, benzotriazole, salicylate, etc.

The concentration of photoabsorber in the mixture may be similar to the concentration of photoinitiator in the mixture or may be different.

In some approaches, the mixture includes a polymerization inhibitor of any known type. In one approach, the polymerization inhibitor may be included in the commercially obtained ceramic precursor, e.g., the POSS molecule composition. Illustrative examples of a polymerization inhibitor include tert-butylhydroquinone, hydroquinone, 4-methoxyphenol, phenothiazine, etc. In some approaches, the resin may include a polymerization inhibitor at an effective amount for inhibiting continuous polymerization of the polyfunctional monomer after laser irradiation but not at an effective amount to prevent formation of a three-dimensional structure by light-mediated additive manufacturing techniques.

Figure 5:
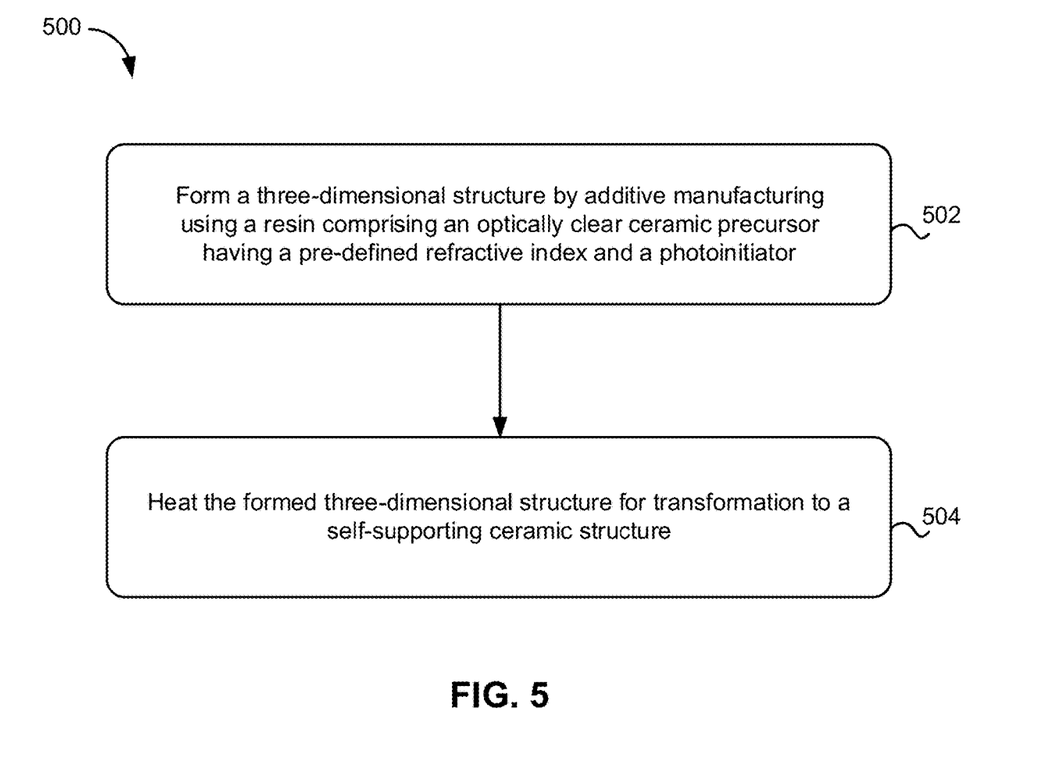
FIG. 5 is a flowchart of a method, according to one embodiment.

FIG. 5 shows a method 500 for forming a self-supporting ceramic structure having a pre-defined geometric arrangement of features, wherein the features have an average diameter in a range of greater than about 50 nm to less than 300 nm, in accordance with one embodiment. As an option, the present method 500 may be implemented to form structures such as those shown in the other FIGS. described herein. Of course, however, this method 500 and others presented herein may be used to provide applications which may or may not be related to the illustrative embodiments listed herein. Further, the methods presented herein may be carried out in any desired environment. Moreover, more or less steps than those shown in FIG. 5 may be included in method 500, according to various embodiments. It should also be noted that any of the aforementioned features may be used in any of the embodiments described in accordance with the various methods.

Method 500 begins with step 502 of forming a 3D structure by additive manufacturing using a resin comprising an optically clear ceramic precursor having a pre-defined refractive index and a photoinitiator. In preferred approaches, each molecule of the ceramic precursor has more than two photopolymerizable functional groups, at least one of which is functionalized with, i.e., covalently bound to, a refractive index-tuning group thereby causing the ceramic precursor to have the pre-defined refractive index.

In various approaches, the photopolymerizable functional group may include at least one of the following: acrylate, methylacrylate, allyl, a combination thereof, etc. In various approaches as described herein, the refractive index-tuning group includes a thiol group, a thiophenol group, etc.

Figure 6A:
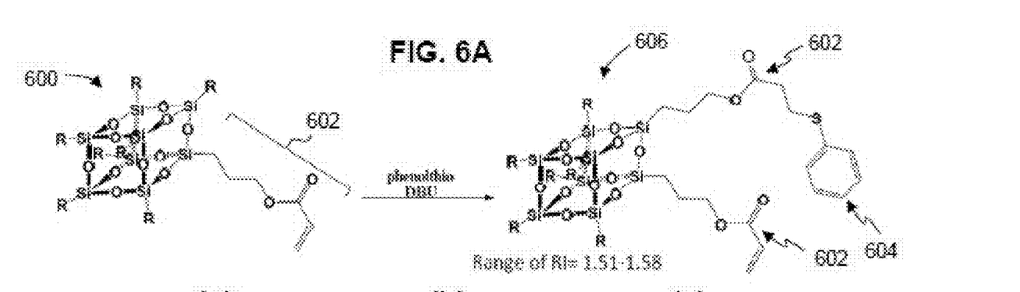
FIG. 6A is a schematic drawing of a functionalization of a POSS molecule with a thiophenol group, according to one embodiment.

In various approaches, the ceramic precursor is a silicon oxycarbide precursor. In an exemplary approach, the ceramic precursor is a polyhedral oligomeric silsesquioxane (POSS). As illustrated in FIG. 6A, a POSS molecule 600 includes 8 functional groups R characterized as acrylate groups 602. At least one of the acrylate groups 602 may be functionalized with a thiophenol group 604 to tune the RI of the POSS molecule 606.

Figure 6B:
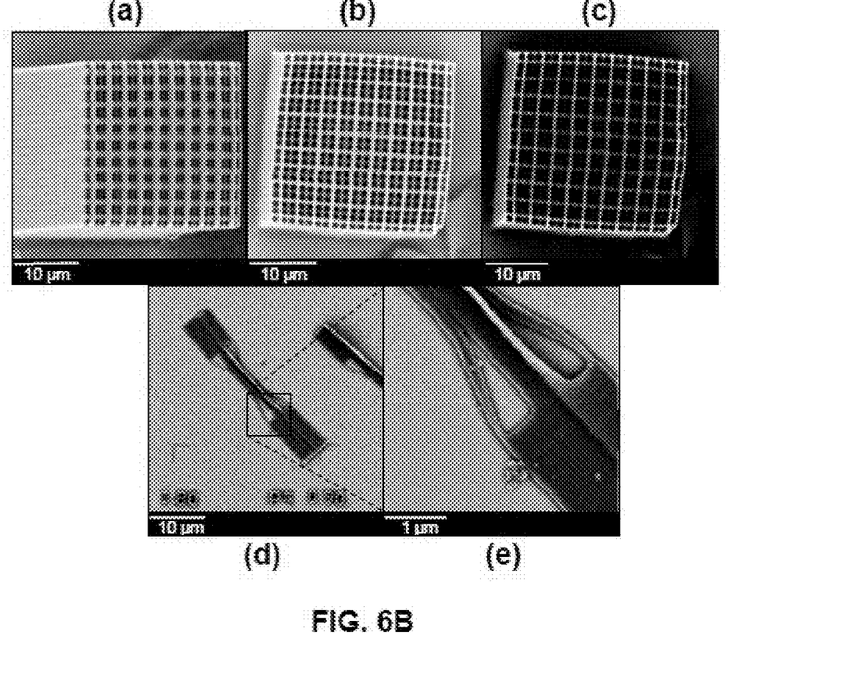
FIG. 6B is a series of images of self-supporting structures formed by dip-in TPP lithography using refractive index matched resins, according to one embodiment. Part (a) is an image of a structure formed having thicker features, part (b) is an image of a structure formed having middle thickness features, and part (c) is an image of a structure formed with thinner features. Part (d) is an image of a part having a complex geometry formed by TPP lithography, according to one embodiment, and part (e) is a higher magnified image of a portion of the part of part (d).

FIG. 6B includes a series of images of structures formed using the optically clear ceramic precursor having functionalized acrylate groups as depicted in the POSS molecule 606 of FIG. 6A. The various images show the changes in diameter of printed strut with varying laser power a using TPP-DLW system. All structures were formed using a 4.5 laser peak intensity TW/cm$^2$. Each image shows a self-supporting structure with varying strut size, e.g., feature size. The image of part (a) shows a structure having thicker struts, the image of part (b) shows a structure having thinner struts, and the image of part (c) shows a structure having the thinnest struts. The image of part (d) depicts a complex printed part, and a magnified view of a portion of the part is shown in the image of part (e).

In an exemplary approach, an optically clear resin having an RI matched to the focusing unit of the direct laser writing system allows high resolution of features (e.g., ligaments, struts, structural components, etc.) of the printed structure.

In various approaches, the concentration of inhibitor (e.g., stabilizer) for a mixture used in forming a 3D structure by AM techniques may be in a range of greater than 100 to about 400 ppm but could be higher or lower. In some approaches, the inhibitor may be included in the ceramic precursor composition that has been obtained commercially.

In various approaches, additive manufacturing techniques allow the formation of three-dimensional structures having ligaments defining pores therebetween, where the dimensions of the ligaments and subsequent pores therebetween may be controlled by additive manufacturing techniques. In some approaches, the pores between the ligaments of the formed 3D structure may have an average diameter greater than about 100 nanometers.

In one approach, the forming of a 3D structure by AM includes light-mediated AM techniques. In some approaches, the 3D structure is formed by direct laser writing via two photon polymerization (TPP-DLW), including conventional mode and dip-in mode. In some approaches, light-mediated AM techniques form engineered 3D structures, e.g., gyroids, log-pile, unique-shaped parts, bridge-like structures, etc.

In preferred approaches utilizing the dip-in mode of TPP-DLW technique, a pre-defined refractive index of the ceramic precursor is preferably configured to match the focusing optic of a machine performing the direct laser writing. For example, if using the dip-in mode of TPP with a high NA objective lens, a resin having a RI of 1.52±0.005 is critical for forming a green body structure having high resolution of fine features, where the features have an average diameter of greater than 100 nm to less than 300 nm.

Referring again to FIG. 5, step 504 includes heating the formed 3D structure for transformation to a self-supporting ceramic structure. Conventional heating techniques may be used in step 504, such as, for example, pyrolysis in an inert atmosphere.

In one approach, the 3D structure may be pyrolyzed by heating the specific photoresist resin components of the 3D structure to a temperature effective to remove oxygen, hydrogen and possibly carbon in the form of CO, $CO_2$, $H_2O$, etc. from the structure. For example, in one approach, the structure may be heated to temperatures in a range of greater than 500° C. to about 1500° C. In preferred approaches, the heating results in a structure comprised of silicon oxycarbide ceramic material.

Following pyrolization of the parts at temperatures greater than 1000° C. under inert atmosphere, the structures and features of the pyrolyzed structures may exhibit shrinkage in a range of approximate 10% to 50% of the original size of the green body structure and associated features.

According to one embodiment, a ceramic product includes a printed self-supporting 3D ceramic structure formed by additive manufacturing. The printed self-supporting three-dimensional ceramic structure includes a pre-defined geometric arrangement of features having an average diameter in a range of greater than 50 nanometers to less than 1000 nanometers. In preferred approach, an average diameter of the features may be in a range of greater 50 nanometers to less than 300 nanometers. Features of the structure may include struts, ligament, filaments, support features, etc.

In some approaches, the printed self-supporting 3D ceramic structure includes a silicon oxycarbide ceramic material. In other approaches, nitrogen containing groups may generate a silicon nitride carbide (SiNC) ceramic. In one approach, boron containing acrylate precursor molecules may generate boron carbides (BC), boron nitride carbides (BNC), any combinations thereof, etc.

Figure 7:
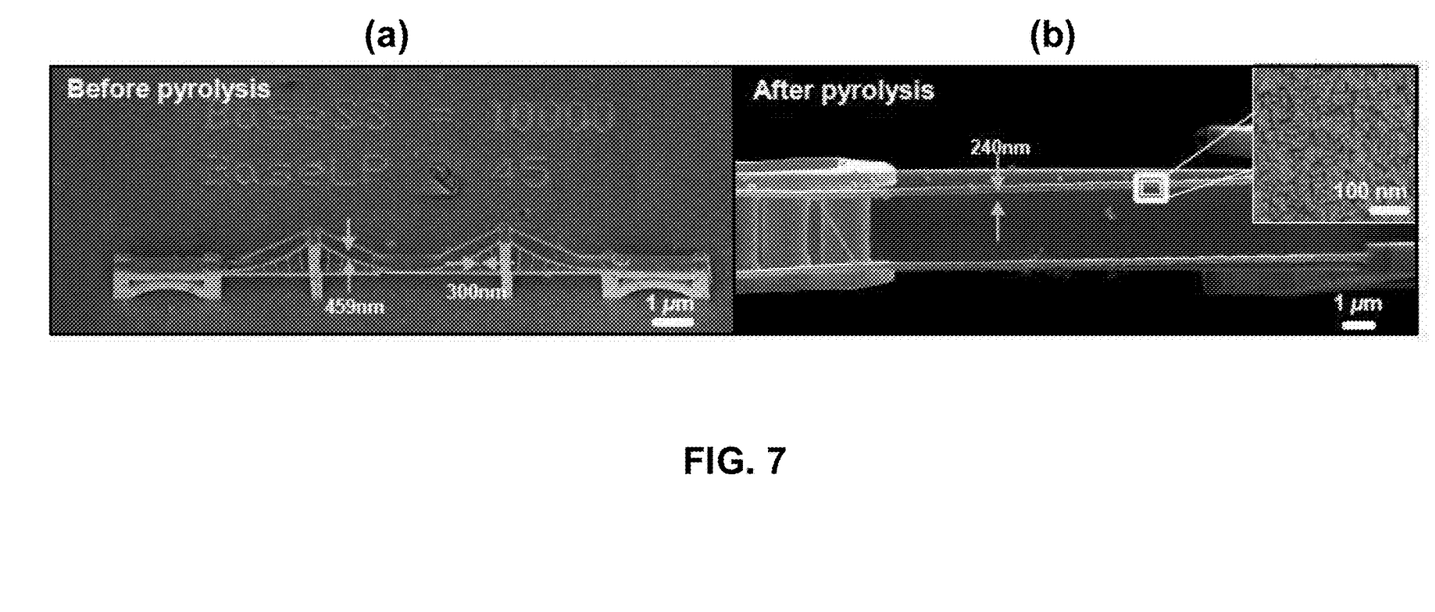
FIG. 7 is a series of images of a self-supporting structure having complex geometry, according to one embodiment. Part (a) depicts the structure formed by TPP lithography before pyrolysis, and part (b) depicts the structure of part (a) after pyrolysis.

FIG. 7 depicts a self-supporting structure having pre-defined geometric arrangement of features. Using dip-in mode of DLW-TPP, a bridge-like structure was fabricated having features with an average diameter of about 300 nm before pyrolysis, as depicted in part (a). After pyrolysis, as shown in part (b), the features have an average diameter of about 240 nm. An inset in the part (b) depicts the ceramic material composition after pyrolysis. These structures are by way of example only and are not meant to be limiting in any way.

Experiments

All material was used as received. 7-diethylamino-3-thenoylcoumarin (DETC; Exciton, USA), Pentaerythritol triacrylate (PETA; Alfa Aesar, MA, USA) contains 300 to 400 ppm 4-methoxyphenol (MEHQ) as inhibitor, Bisphenol A ethoxylate diacrylate (BPADA; Sigma-Aldrich, MO, USA) contains 250 ppm MEHQ as inhibitor, thiophenol (Sigma-Aldrich, MO, USA), and acrylic polyhedral oligomeric silsesquioxane (Acro-POSS, Hybrid Plastics, MS, USA).

All other solvents utilized for processing and synthesis of nanofabrication resin were acquired from Aldrich and used as received such as dichloromethane (DCM), isopropanol (IPA), triethylamine (TEA), and Propylene glycol monomethyl ether acetate (PGMEA).

A commercially available Acro-POSS was modified with thiophenol groups using 1,8-diazabicyclo[5.4.0]undec-7-ene. Product was then extracted with dichloromethane three times. Organic layers were combined and concentrated to yield a clear acrylic monomer composition. The resin included a homogenous mixture of functionalized POSS having eight acrylate groups modified with thiophenol groups (measured to have a core RI of 1.57) with non-functionalized acrylic POSS of 1.48 RI to accurately formulate a printable resin at 1.5222 at 589 nm. The POSS-thiophenol-formulated resin refractive index matched the refractive index of the immersion oil used in the TPP processing, thereby providing the capability of using the resin to print in dip-in mode of TPP processing. The dip-in approach resulted in the smallest voxel size for smaller features. The resin included 0.1 wt. % 7-diethylamino-3-thenoylcoumarin (DETC) photoinitiator yield a printable feature reached 100 nm using 10 centimeters per second laser speed with 45% laser power. Subsequent sintering of the printed structure cause a shrinkage of about 5% to 40% of the green body, pre-sintered features.

In another approach, a preceramic-based resin capable of matching the high NA objective lens replaced immersion oil in the dip-in mode of the TPP process. Outputted printed ceramic-based feature sizes with an average diameter in a range of about 300 to 400 nm; and sintered ceramic structure have features having an average diameter in a range of 100 nm to 200 nm.

As illustrated in FIG. 8, an optically clear ceramic precursor functionalized with 2.5 mmol of thiophenol to have RI matched to 1.520±0.005 was tested for printability. The resin used to form the structures in part (a) and (b) were exactly tuned 1.52 RI by covalently bounding 2.5 mmol thiophenol. The resins used to form the structures in parts (c) and (d) were tuned by a mixture of higher RI functionalized POSS (8 mmol thiophenol) with low RI POSS (zero thiophenol). Printing with these resins demonstrated that a resin having a mixture of RI POSS molecules (high RI and low RI) and a resin of covalently tuned POSS print the same voxels using dip-in mode TPP process. Part (e) is an image of a magnified view of a portion of the self-supporting part before pyrolysis (part (c)). Part (f) is an image of a magnified view of a portion of the self-supporting part after pyrolysis (part (d)).

Figure 9:
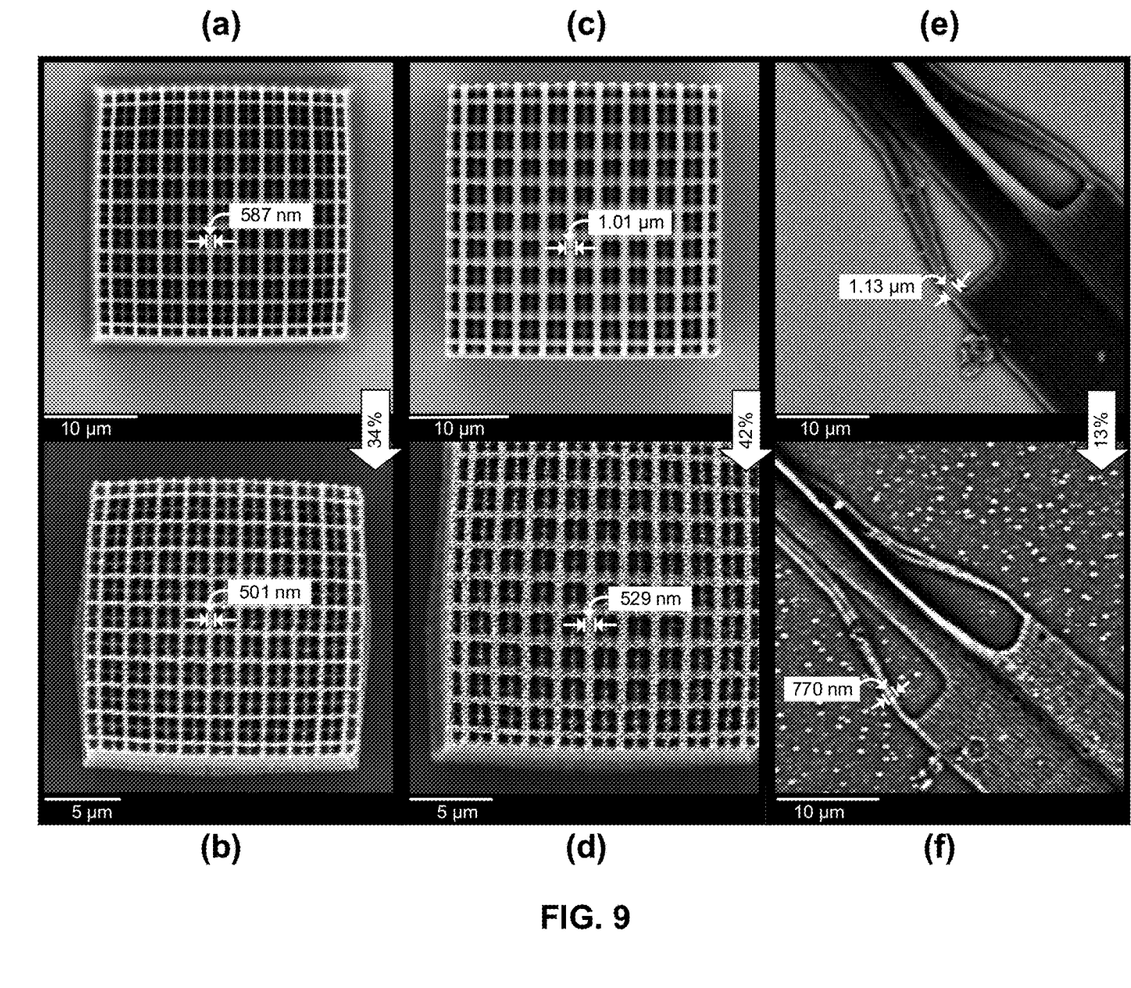
FIG. 9 depicts a series of images of structures before pyrolysis as shown in parts (a), (c), and (e), and images of the structures after pyrolysis as shown in parts (b), (d), and (f), according to various embodiments.

As illustrated in FIG. 9, images of a printed structures formed with an optically clear ceramic precursor resin formed self-supporting structures, parts (a) and (c) and a pre-defined complex design structure in part (e). The green body structure depicted in part (a) shrank approximately 34% to the pyrolyzed structure depicted in part (b), demonstrating that a strut having an approximate diameter of 587 nm shrank to an average diameter of 501 nm. The green body structure depicted in part (c) shrank approximately 42% to the pyrolyzed structure depicted in part (d), demonstrating that a strut having an approximate diameter of 1.01 μm shrank to an average diameter of 529 nm. Following pyrolization, the complex design of a green body part depicted in part (e) shrank approximately 13% to the pyrolyzed part depicted in part (f), demonstrating that a printed green body having a feature having an approximate diameter of 1.13 μm shrank to a pyrolyzed structure with a feature having an average diameter of 770 nm.

In Use

According to various embodiments, 3D-printable ceramic resin for extremely fine 3D printed structures may be used in complex design for ceramic blades supporting laser reflective mirrors. In some embodiments, the 3D-printable ceramic resin may be used for fabricating medical devices having nanoscale features, electronic devices, structural support, semiconductor parts, etc.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments but should be defined only in accordance with the following claims and their equivalents.

What is claimed is:

1. An optically clear resin for additive manufacturing, the resin comprising:
   an optically clear ceramic precursor having a pre-defined refractive index,
   wherein each molecule of the ceramic precursor has at least two photopolymerizable functional groups and at least one refractive index-tuning group that is different than the photopolymerizable functional groups thereby causing the ceramic precursor to have the pre-defined refractive index,
   wherein one or more of the at least one refractive index tuning group is a thiolphenol group, wherein the thiolphenol group is an end group,
   wherein at least one of the at least two photopolymerizable functional groups includes an acrylate group,
   wherein the molecule of the ceramic precursor is a polyhedral oligomeric silsesquioxane.

2. The resin as recited in claim 1, wherein each molecule of the ceramic precursor has up to six photopolymerizable functional groups.

3. The resin as recited in claim 1, wherein at least one of the other of the at least two photopolymerizable functional groups is selected from the group consisting of: methyl acrylate, acrylate, allyl, and a combination thereof.

4. The resin as recited in claim 1, wherein the ceramic precursor includes at least one non-photopolymerizable group selected from the group consisting of: a hydroxyl group and an amino group.

5. The resin as recited in claim 1, wherein the pre-defined refractive index is 1.52±0.005.

6. The resin as recited in claim 1, wherein the resin is essentially free of particles.

7. The resin as recited in claim 1, wherein the resin is a single phase system.

8. The resin as recited in claim 1, wherein the additive manufacturing is a direct laser writing technique, wherein the pre-defined refractive index of the ceramic precursor is configured to match a focusing optic of a machine performing the direct laser writing technique.

9. The resin as recited in claim 1, comprising a photoinitiator, wherein a concentration of the photoinitiator in the resin is in a range of about 0.05 wt. % to about 1.0 wt. % of weight of total resin.

10. The resin as recited in claim 1, wherein the molecule of the ceramic precursor has a structure as follows:

wherein R individually is —CH$_2$CH$_2$CH$_2$OC(O)CH═CH$_2$ or —CH$_2$CH$_2$CH$_2$OC(O)CH$_2$CH$_2$SPh, wherein the structure has at least two acrylate end groups.

11. The resin as recited in claim 10, wherein the pre-defined refractive index of the molecule of the ceramic precursor is in a range of 1.42 to 1.57.

12. A method of forming a self-supporting ceramic structure using the optically clear resin as recited in claim 1, wherein the ceramic structure has a pre-defined geometric arrangement of features, wherein the features have an average diameter in a range of greater than about 50 nanometers to less than 300 nanometers, the method comprising:
   forming a three-dimensional structure by additive manufacturing using the resin; and
   heating the formed three-dimensional structure for transformation to the self-supporting ceramic structure.

13. The method as recited in claim 12, wherein each molecule of the ceramic precursor has up to six photopolymerizable functional groups.

14. The method as recited in claim 12, wherein forming the three-dimensional structure comprises using a dip-in mode of direct laser writing via two photon polymerization.

15. The method as recited in claim 12, wherein forming the three-dimensional structure comprises using direct laser writing, wherein the pre-defined refractive index of the ceramic precursor is configured to match a focusing optic of a machine performing the direct laser writing.

16. The method as recited in claim 12, wherein a temperature of the heating is in a range of above about 500 degrees Celsius to about 1500 degrees Celsius.

* * * * *